US008767766B2

(12) United States Patent
He et al.

(10) Patent No.: US 8,767,766 B2
(45) Date of Patent: Jul. 1, 2014

(54) DETERMINISTIC BACK-OFF METHOD AND APPARATUS FOR PEER-TO-PEER COMMUNICATIONS

(75) Inventors: Yong He, Beijing (CN); Xiaojun Ma, Beijing (CN); Jun Li, Indianapolis, IN (US); Charles Chunaming Wang, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 519 days.

(21) Appl. No.: 12/920,515

(22) PCT Filed: Feb. 25, 2009

(86) PCT No.: PCT/US2009/001179
§ 371 (c)(1), (2), (4) Date: Sep. 1, 2010

(87) PCT Pub. No.: WO2009/114068
PCT Pub. Date: Sep. 17, 2009

(65) Prior Publication Data
US 2011/0007656 A1    Jan. 13, 2011

(30) Foreign Application Priority Data
Mar. 3, 2008   (EP) .................................... 08300128

(51) Int. Cl.
*H04L 12/413*   (2006.01)
*H04W 74/08*   (2009.01)

(52) U.S. Cl.
CPC ................................ *H04W 74/0808* (2013.01)
USPC .......................................... 370/445; 370/458

(58) Field of Classification Search
None
See application file for complete search history.

(56) References Cited

U.S. PATENT DOCUMENTS

| | | | | |
|---|---|---|---|---|
| 4,570,257 A * | 2/1986 | Olson et al. | ................... | 370/216 |
| 6,553,020 B1 * | 4/2003 | Hughes et al. | ............... | 370/347 |
| 6,885,656 B2 * | 4/2005 | Sashihara | ..................... | 370/350 |
| 7,903,822 B1 * | 3/2011 | Hair et al. | ..................... | 380/282 |
| 8,264,973 B2 * | 9/2012 | Vasan et al. | ................... | 370/250 |
| 2004/0131025 A1 * | 7/2004 | Dohler et al. | ................. | 370/328 |
| 2005/0152364 A1 | 7/2005 | Tagami et al. | | |
| 2005/0213514 A1 | 9/2005 | Su et al. | | |
| 2005/0243788 A1 * | 11/2005 | Janczak | ........................ | 370/341 |
| 2006/0239293 A1 * | 10/2006 | Vasil'evich et al. | .......... | 370/445 |
| 2007/0160060 A1 * | 7/2007 | Dalmases et al. | ......... | 370/395.4 |

(Continued)

OTHER PUBLICATIONS

Int'l Search Report, Jun. 11, 2009, PCT.

*Primary Examiner* — Hassan Kizou
*Assistant Examiner* — Roberta A Shand
(74) *Attorney, Agent, or Firm* — Robert D. Shedd; Jerome G. Schaefer

(57) ABSTRACT

A method and apparatus are described including identifying a channel that a decentralized network is using for communications and identifying a station that is a member of the decentralized network to monitor data transmission activity over the identified channel. Also described are a method and apparatus for a station to transmit data over a communication medium of a decentralized network including monitoring the communication medium, determining if the communication medium is idle, transmitting data if the communication medium is idle and if the station has a data to transmit and adjusting a slot count and a service ring configuration if the medium is busy. Further described are a method and apparatus including monitoring a communication channel used by a decentralized network, determining a number of available idle time slots between two successive frame transmissions initiated by different stations, updating a service ring, adjusting a number of stations and adjusting a slot count.

18 Claims, 6 Drawing Sheets

(56) References Cited

U.S. PATENT DOCUMENTS

| | | | |
|---|---|---|---|
| 2008/0013567 A1* | 1/2008 | Benveniste | 370/447 |
| 2008/0101308 A1* | 5/2008 | Gaur | 370/338 |
| 2008/0268855 A1* | 10/2008 | Hanuni et al. | 455/445 |
| 2009/0141738 A1* | 6/2009 | Li | 370/448 |
| 2011/0083165 A1* | 4/2011 | Gopinath et al. | 726/4 |

* cited by examiner

DETERMINISTIC BACK-OFF METHOD AND APPARATUS FOR PEER-TO-PEER COMMUNICATIONS

This application claims the benefit, under 35 U.S.C. §365 of the International Application PCT/US2009/01179, filed Feb. 25, 2009, which was published in accordance with PCT Article 21(2) on Sep. 17, 2009 in English and under 35 U.S.C. §119 of European Procedure Application 08300128.9 filed Mar. 3, 2008.

FIELD OF THE INVENTION

The present invention relates to media access in contention-based networks and in particular to gaining access to a communications medium in contention-based peer-to-peer networks by reduction or, elimination of contention in the contention-based peer-to-peer networks.

BACKGROUND OF THE INVENTION

The popularity of voice and video applications over mobile computing devices has raised concerns regarding the performance of medium access control (MAC) protocols, which are responsible for allocating shared medium resources to multiple communicating stations and resolving collisions that occur when two or more stations access the medium simultaneously. In the current IEEE 802.11 wireless LANs, the distributed coordination function (DCF) of the MAC protocol layer uses a binary exponential back-off (BEB) algorithm for fundamental channel access. The BEB algorithm mitigates the issue of network collisions by randomizing the timing of medium access among stations that share the communication medium. However, as demonstrated by both practical experience and theoretical analysis, the BEB algorithm has some deficiencies. First, the collision probability for a transmission attempt increases exponentially with the number of active stations in the network, which significantly impairs the network throughput for large-scale networks. Second, the medium access delay cannot be bounded and the jitter is variable, which may not be suitable for multimedia applications. Third, the opportunity for medium access is not fair among stations. That is, a given station may gain access to the communication medium and get served for a long time. This results in other stations having to greatly defer their access to the medium. Moreover, it turns out that the use of doubling the contention window upon failed transmissions appears to give more transmission opportunities to these successful stations.

The concept of reducing or eliminating contention in contention-based networks was introduced by the present Applicants using a form of round robin scheduling in an earlier patent applications PCT Application Ser. Nos. PCT/US2007/014607 and PCT/US2007/014608. This concept works well in contention-based networks where there is a centralized controller or coordinator, which can be the global repository of knowledge and equally importantly disseminate and distribute that global knowledge in order to coordinate the activities of the nodes or stations of the network.

The earlier applications described a back-off method that sought to improve the performance of the legacy random back-off procedure. The method adopted a different approach to resolve external collisions. Deterministic values were selected for the back-off slot counts. Thus, there was no duplication among distributed slot counts and each station could exclusively access the medium without colliding with others. By cycling the slot count though a fixed interval [0, N], where N was the number of stations in the network, the method offered a round robin type service among the stations. Therefore, the method provided guaranteed fairness for the network, and furthermore analysis showed that the method had high network efficiency for moderate to heavy traffic loads. The round robin type service cycling through the N stations amounted to scheduling stations such that each station received a fair amount of time. The stations could be mobile or fixed and the network could be wired or wireless. However, the station might also have been stationary and the network could have been any contention-based network. That invention was directed to any contention-based network where the station used a physical or virtual carrier sense mechanism to determine if the network was busy. This included any networks whose MAC layer protocol builds on CSMA, such as cable networks. Note that the term "slot" in the following text may refer to a period of uninterrupted frame exchange (a busy time slot), or a fixed duration for physical carrier sensing (an idle time slot).

A major feature of the method was that, under saturated traffic scenarios, the time interval/period between successive frame exchange sequences initiated by two separate stations was only one Distributed coordination function Inter-Frame Slot (DIFS) plus one slot time. Such an inter-space time interval/period was shorter than that of conventional random back-off methods used by DCF/EDCA (Enhanced Distributed Channel Access), but longer than the Point Coordination Function (PCF) time interval/period that is used by the PCF/HCCA (Hybrid coordination function (HCF) Controlled Channel Access) mechanism. Moreover, the method regulated a sequential service order among the stations, while conventional random back-off methods did not have such a feature. As used herein, "/" denotes alternative names for the same or similar components or structures. That is, a "/" can be taken as meaning "or" as used herein.

Network collisions are an annoying issue for the CSMA based wireless communications, as collisions greatly degenerate network performance, particularly in terms of throughput and network efficiency. However, collisions are eliminated (or greatly reduced) in the deterministic back-off (communication medium access) method of Applicants' earlier applications. Each station could exclusively take control of the communication medium after its slot count reached zero. In this sense, the deterministic back-off method outperformed legacy random back-off methods. An alternative embodiment included an option of inserting a station/node into the round robin service schedule more than once per round. This alternative embodiment permitted a form of prioritization.

FIG. 2 depicts the time slot assignments of Applicants' earlier applications. A mobile station i running the deterministic back-off method decrements its slot count slot(i) whenever the medium has been sensed to be idle for a DIFS time. It should be noted that the number of slots is in general equal to the number of station/nodes. In the alternative embodiment where a form of prioritization was described, the slot count was greater than the number of stations/nodes to accommodate insertion of a given station/node more than once in the schedule of round robin service. When the slot count slot(i) reaches zero and there is a frame pending in the transmission queue, station/node commences frame transmission. The slot count determined when the mobile station needed to restart the slot counter for a new round of service was calculated deterministically using the deterministic back-off method using the following two equations:

$$\text{slot}(i) = C_0(i, t, \vec{x}) \tag{1}$$

$$\text{slot}(i) = C_1(i, t, \vec{x}) \tag{2}$$

where i is the station ID, t is the current time and $\vec{x}$ is the state variable vector that represents information necessary for the decision. The first equation is used for a station to access the network for the first time after successful association with the network. The second equation is used in subsequent iterations. Both $C_0(i, t, x)$ and $C_1(i, t, x)$ are deterministic functions that given the value of i, t and $\vec{x}$, a unique value for each station is derived as the output. Thus, at this step, instead of selecting the slot count slot(i) randomly within a contention window as in the BEB algorithm, the slot count is reset to a deterministic value according to equations (1) and (2).

FIG. 1 is a flowchart of the operation of the deterministic back-off method of Applicants' earlier applications from the perspective of the station. At 160 the joining station sends a request to join the network to the AP. The joining station then waits until it receives the communications medium access (deterministic back-off) method from the AP, as well as the slot count, the number of stations in the network and the address queue at 165. At 170, the joining station determines if it supports the communication medium access (deterministic back-off) method used by the network. If the joining station determines that it supports the communication medium access method then it saves the slot count, the address queue and the number of stations in the network at 180. The station proceeds as described above to gain access to the communication medium in accordance with the principles of the invention. If the joining station determines that is does not support the communication medium access method of the invention then it sends the AP a dissociation message at 175. Of course, if the joining station is already a member of (associated with) the network then 160, 165, 170, 175 and 180 are skipped/not executed. If the joining station is already associated with the network then the AP waits a predetermined time period at 150. The slot count is adjusted at 125. In an exemplary embodiment the slot count is decremented by one. An adjustment that is incremented could also be used. The slot count is compared to a predetermined value at 130. The exemplary embodiment of FIG. 1 compares the adjusted (decremented) slot count to 0. If the slot count has reached the predetermined value then at 135 the station determines if the station has a data frame to transmit. If the station has a data frame to transmit then data frame transmission is initiated at 140. If the station does not have a data frame to transmit then the station skips its turn and selects a new slot count at 145. Once data frame transmission has been initiated then the station selects a new slot count at 145. If the slot count had not reached the predetermined value at 130, then the station waits a predetermined time period at 150.

In the deterministic back-off method of the earlier applications, a new round of back-off was invoked whenever the slot count was decremented to zero, regardless of the status of pending transmission queue. When the slot count reached zero but there was no data to send, the station would forgo its transmission opportunity and go to the next round of back-off by re-setting the slot count according to equation (2). This mechanism was introduced to preserve the relationship between the distributed slot counts during the network's operation.

Functions $C_0(i, t, \vec{x})$ and $C_1(i, t, \vec{x})$ were carefully designed to derive appropriate values when setting the slot count. In that design, at any time, all the slot count values in the network formed a set whose cardinality was equal to (or greater than if prioritization is offered) the number of stations. Considering the efficiency of the algorithm in terms of network utility, the maximum element of the set S (denoted as max(S)) was set to a value as small as possible. A small max(S) means a shorter time between successive service opportunities for a station/node. A large max(S) may waste bandwidth because some time slots would never be used by any station/node. In one embodiment, both functions were chosen as constant functions with the constant being the number of stations/nodes associated with the network. That is, $$C_0(i,t,\vec{x})=N \quad (3)$$

$$C_1(i,t,\vec{x})=N \quad (4)$$

The deterministic back-off method based on equations (3) and (4) formed a round robin service among stations. FIG. 2 gives an exemplary illustration of the first embodiment. In view of the shared network medium, each time slot is assigned to a specific station. The time slot served as the entry for that station to access the medium. A medium access opportunity is granted to a station whenever its slot count was decremented to zero. Thus, the transmission opportunity is passed around the stations/nodes in a round robin manner. During each round of service, a station/node is granted exactly one opportunity for data transmission. If at that time it has no pending data in its transmission buffer, it forgoes the transmission opportunity, and another station with next higher slot count takes over the opportunity in the next time slot.

In an alternative embodiment, however, while max(s) was set as small as possible, max(s) may be greater than the number of stations/nodes in order to permit insertion of a given node(s)/station(s) into the round of service more than once and thereby provide a form of prioritization.

However, the above method does not work well in an infrastructureless network, such as a peer-to-peer network, where there is no central coordinator or controller to be the global repository and to disseminate such knowledge in order to coordinate the nodes and stations. Peer-to-peer networks are further complicated because nodes and stations in a peer-to-peer network may join or leave the network at any time. Further performance degrades using the DEB method in cases where the number of active station is small and/or the traffic load is light.

SUMMARY OF THE INVENTION

The present invention is directed to a deterministic back-off method for peer-to-peer communication networks. The method and apparatus of the present invention can be used for any peer-to-peer communication network including both wired and wireless. The present invention is particularly desirable for single hop wireless peer-to-peer communication networks. Peer-to-peer communication networks are infrastructureless. That is, there is no central controller/coordinator. Thus, the deterministic back-off method alone of the earlier application will not work well. The present invention introduces a self-learning method. The self-learning method facilitates the use of the deterministic back-off method in peer-to-peer communication networks.

A method and apparatus are described including identifying a channel that a decentralized network is using for communications and identifying a station that is a member of the decentralized network to monitor data transmission activity over the identified channel. Also described are a method and apparatus for a station to transmit data over a communication medium of a decentralized network including monitoring the communication medium, determining if the communication medium is idle, transmitting data if the communication medium is idle and if the station has a data to transmit and adjusting a slot count and a service ring configuration if the medium is busy. Further described are a method and apparatus including monitoring a communication channel used by a decentralized network, determining a number of available idle time slots between two successive frame transmissions initiated by different stations, updating a service ring, adjusting a number of stations and adjusting a slot count.

BRIEF DESCRIPTION OF THE DRAWINGS

The present invention is best understood from the following detailed description when read in conjunction with the accompanying drawings. The drawings include the following figures briefly described below where like-numbers on the figures represent similar elements:

FIG. 3A depicts self-learning phase 1 and FIG. 3C depicts self-learning phase 2. FIG. 3B is a flowchart of a station initiating a frame transmission.

DETAILED DESCRIPTION OF THE PREFERRED EMBODIMENTS

Figure 1:
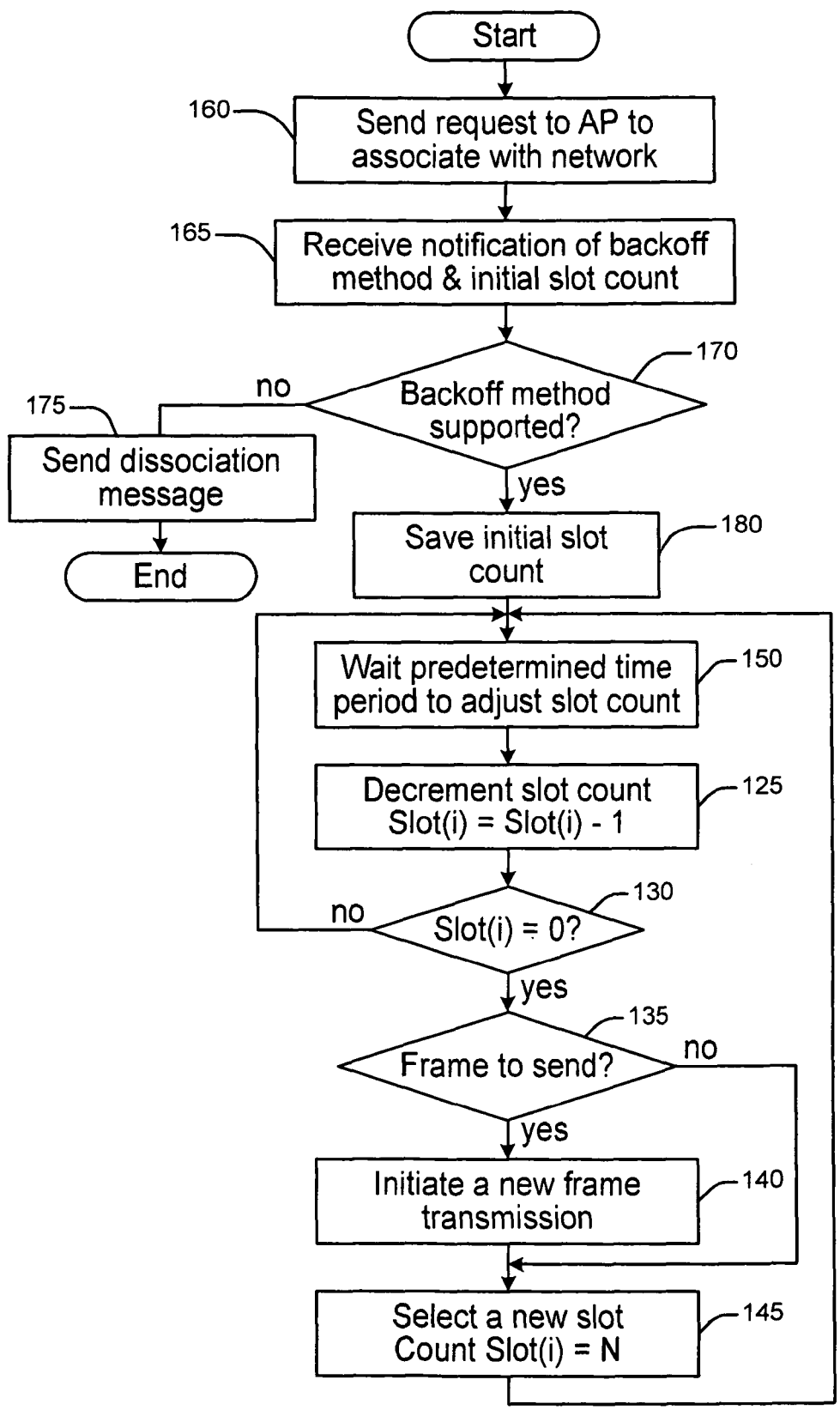
FIG. 1 is a flowchart of the deterministic back-off method of Applicant's earlier application.
Figure 2:
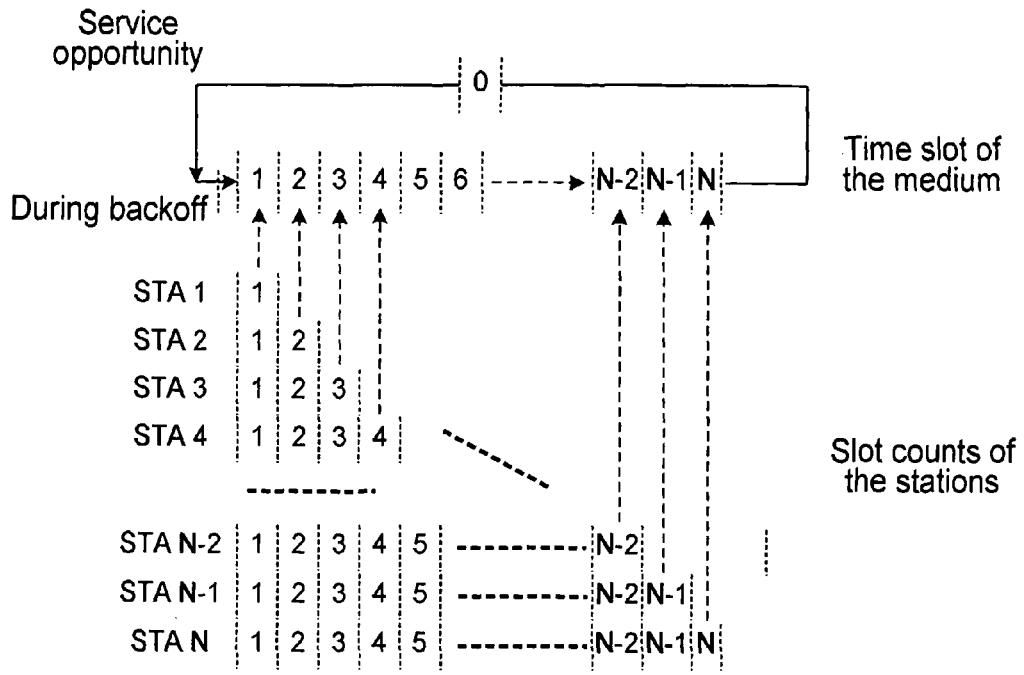
FIG. 2 depicts the time slot assignments of Applicant's earlier application.

The present invention extends the scope of the deterministic back-off method to decentralized/peer-to-peer communication networks and is particularly applicable to wireless single hop infrastructureless communication networks. Specifically, the deterministic back-off method is applied to medium access control in the peer-to-peer environment. A self-learning method is introduced to enable a station/node to obtain necessary information in a decentralized fashion. The self-learning method facilitates the round robin service among communicating peers/nodes/stations. As used herein, the term "frame transmission" can be any form of data transmission including frames, packets or any other form or format.

Since the peer-to-peer network paradigm lacks support of a central controller/coordinator, no single station/node/peer can be relied upon to control or synchronize the information among stations/nodes/peers to ensure proper operation of the deterministic back-off method. Moreover, the ad hoc characteristic of such peer-to-peer networks assumes that a station/node/peer can join or leave the network at any time, without performing any association/dis-association procedure.

All of the issues identified above mean that applying the deterministic back-off method in peer-to-peer communications networks is a challenge. Each station/node/peer sharing the communication medium needs to obtain a copy of the global information including, for example, the number of stations in the network, in order to adjust its back-off slot count for medium access. The self-learning method introduced herein alters the way in which global information is both obtained and disseminated in peer-to-peer communication networks. This allows the use of the deterministic back-off method to be adapted to the unique issues of a peer-to-peer communication network and preserve the advantages of round robin service for medium access. For the round robin service, it is important to keep the relative serving order between stations instead of keeping an absolute value of the number of stations. The present invention ensures round robin service by maintaining a service ring for each station.

In the present invention, each station/node/peer is a peer-to-peer network member and operates based on the local information of the network that it has. The online self-learning method of the present invention is introduced in order to obtain this information. The self-learning method provides two important pieces of information: 1) the number of active contending stations/nodes/peers in the network and 2) the relative serving order among those stations/nodes/peers. The former, denoted as $N_x$, is used to reset the back-off slot count after the back-off slot count is decremented to zero, i.e., $$C_0(i,t,\vec{x}) = C_1(i,t,\vec{x}) = N_x \qquad (5)$$

The latter, expressed as a service ring R, describes the relative position in each round of service for medium access among stations/nodes/peers. The service ring R can have the following form, for example

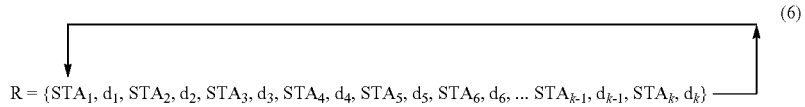

$$R = \{STA_1, d_1, STA_2, d_2, STA_3, d_3, STA_4, d_4, STA_5, d_5, STA_6, d_6, \ldots STA_{k-1}, d_{k-1}, STA_k, d_k\} \qquad (6)$$

$STA_k$ is the current station, and $d_i \geq 1$, $1 \leq i \leq k$, and $d_i$ ($1 \leq i \leq k$) denotes the number of time slots for $STA_{i+1}$ to gain access of the medium after $STA_i$ finishes its turn in the service ring. In other words, $d_i$ represents the interval in terms of physical time slots between the two service opportunities for $STA_i$ and $STA_{i+1}$. As used herein, $d_i$ does not represent the number of stations/nodes/peers in the service ring R, but rather indicates the number of stations/nodes/peers between $STA_i$ and $STA_{i+1}$. That is, there may be joining stations/nodes/peers (not currently in the service ring R) served between $STA_i$ and $STA_{i+1}$. The use of $d_i$ is helpful when the information for some stations is unknown. For example, it is possible that though there may be one or more joining stations served between $STA_5$ and $STA_6$, in the self-learning phase 1, they may not have been detected or learned by the member stations. However, the member stations/nodes/peers can derive the $d_i$ by counting the number of consecutive idle time slots between the service opportunities of $STA_5$ and $STA_6$. In this situation, $d_i$ should be greater than 1 and the back-off slot count should be reset by equation (7) instead of equation (5) because of incomplete information of all served stations in the network. The service ring is used to dynamically adjust or calibrate the back-off slot count upon frame transmission. The relationship between $N_x$ and $d_i$ is, $$N_x = \sum_{i=1}^{k} d_i \qquad (7)$$

When the current station $STA_k$ detects that $STA_j$ has initiated a frame transmission, then it can re-align its back-off slot count slot(k) with other stations by setting $$\text{slot}(k) = \sum_{i=j}^{k-1} d_i \quad (8)$$

Note that in equation (8) $d_i \geq 1$, thus after updating the back-off slot count using equation (8), each station/node/peer now holds an exclusive slot count that is not overlapping with slot counts of other stations/nodes/peers at this time. This ensures the proper operation of the round robin service among the stations/nodes/peers. Now, after retrieving these pieces of information, the station/node/peer can operate using the deterministic back-off method. A station/node/peer decreases its back-off slot count when the shared medium is sensed to be idle, and ceases decreasing its slot count upon the shared medium being sensed as busy. Once a station's slot count is decremented to zero, the station/node/peer gets an opportunity to initiate a new frame transmission. If the station/node/peer has no pending frames in its buffer, then it foregoes the opportunity and resets its slot count to $N_x$, which starts a new round of back-off service through the service ring.

Both the value of $N_x$ and $d_i$ can be retrieved by self-learning by the station/node/peer based on network activities. The broadcast nature of the wireless communication makes this learning procedure possible because a station has to receive all frames transmitted over the shared medium (e.g., over the air) to pick out those addressed to itself. The method of the present invention works in a CSMA-Based network with shared medium, for example, in a wired Local area Access Network (LAN). However, it does not work in a network with switches or routers, because the data transmissions through switches or routers are not CSMA-Based. Hence, if not taking channel error and frame loss into consideration, a station/node/peer is aware of all network activities by monitoring the shared communication medium. For a station $STA_k$ that wants to initiate its first access to the communication medium, it can estimate $N_x$ by tracking the number of idle available time slots between two successive frame exchange sequences initiated by the same station. Here the idle available time slot means the physical slot during which each station/node/peer can decrease its back-off slot count. (Hence, the time slot during DIFS cannot be counted.) It should be noted for a steady network, when the transmission opportunity transfers/passes among stations, in each round, the number of idle available time slots remains the same. The number of available idle time slots can be calculated by cumulatively adding the time interval between two transmission opportunities for the same station, i. e., summing $d_i$. According to equation (7), this yields the value of $N_x$. Thus $N_x$ represents the possible number of idle available time slots between a station's two successive transmission opportunities. If it is found that the station $STA_j$ has commenced a new frame exchange sequence after $D_i$ the value of $D_i$ should be equal to or a multiple of the number of stations $N_x$ idle available time slots since the last transmission, then $N_x$ should be a value equal to or a factor of $D_i$ (because it is possible that there was a missed opportunity between two transmissions for the same station). $D_i$ is defined as the number of idle available time slots between the two successive transmissions initiated by the same station. Multiple $D_i$ can be combined to determine a unique $N_x$, because $N_x$ should be the common factor of them.

Like $N_x$, the service ring R can be formed gradually online by self-learning. This procedure operates like the mathematical induction method. At first, after the station 1 has learned the value of $N_x$, R has the form $$R=\{STA_1, d_1\}, \text{ where } d_1=N_x. \quad (9)$$

Then $STA_1$ can fill more items in the brackets and enlarge the ring by learning more information from and about the network. The station/node/peer monitors the time interval between two successive frame transmissions initiated by separate stations. If, $STA_i$ commences a frame transmission after d (where d is used to derive $d_1$). consecutive idle available time slots since $STA_1$ concludes its frame transmission, then $STA_1$ can add $STA_i$ to its ring as, $$R=\{STA_1, d_1, STA_i, d_i\}, \text{ where } d_1 \equiv d (\text{mod } N_x), d_i = N_x - d_1, 1 \leq d_1, d_i \leq N_x \quad (10)$$

Again, if $STA_j$ launches frames after d' (where d' is used to derive $STA_j$ as shown below) consecutive idle available time slots since $STA_i$ concludes its frame transmission, then $STA_1$ can add $STA_j$ to the service ring as, $$R=\{STA_1, d_1, STA_i, d_i, STA_j, d_j\}, \text{ where } d_i \equiv d'(\text{mod } N_x), d_j = N_x - d_1 - d_i, 1 \leq d_1, d_i, d_j \leq N_x \quad (11)$$

This method can be followed iteratively to add other stations into the ring, until no stations/nodes/peers wishing to join the service ring are left out. Moreover, the station/node/peer can use this method to update the service ring whenever a station joins or leaves the peer-to-peer network.

Note that for a new station, the phase 1 self-learning of $N_x$ should be finished before its first access to the medium. The service ring R can be formed after this first access. It is possible that the new station cannot get the value of $N_x$ by self-learning because during this period no station has performed two frame exchanges in the network. In this situation, the new station can determine the $N_x$ by setting it to a random value within a small interval [0, M]. The new station then accesses the medium for the first time using the Point coordination function Inter-Frame Space (PIFS) at a randomly generated time. After it successfully gains control of the medium, it broadcasts a notification message to announce its existence. Stations that receive this notification message, update their $N_x$ (incrementing by 1) and the service ring (inserting the new station/node/peer into the service ring). After this first access by the new station/node/peer, the new station/node/peer adjusts its back-off slot count based on equations (5) and (6), and accesses the medium using DIFS for subsequent transmission opportunities. Note that the subsequent phase 2 self-learning method updates the parameter $N_x$ and service ring R in a timely fashion. Thus, if the $N_x$ is randomly chosen at first, it will be set to a proper value later in the phase 2 self-learning.

A station/node/peer that has been admitted to the network (is a member of the peer-to-peer service ring) indicates its presence by sending frames from time to time. If it has no frame to send within a predetermined interval T, it prepares a null frame and broadcasts the null frame. This is useful for a new station/node/peer to learn the number of stations/nodes/peers, $N_x$, and construct the service ring R completely within a predictable period.

In addition, a station monitors the time slot that is immediately prior to its own time slot in the service ring. If it is found that this time slot has not been occupied for a period longer then a predetermined time T', then the station assumes that this time slot is associated with no station and hence the station can be removed from the service ring R. T' is a system parameter and can be configured for each station. T'=10 s is a reasonable choice for most applications. The station that discovers an empty slot time prior to its own slot time announces this event to the network by broadcasting a notification message. Stations that have successfully received this notification message update their service ring R by decreasing the corresponding $d_i$ by one if $d_i>1$, or remove the corresponding $d_i$ and station from the ring if $d_i=1$. Note that $d_i=1$ indicates that $STA_i$ and $STA_{i+1}$ are served successively in the ring. It does not represent the number of existing stations of the network. If $d_i=1$ and $STA_{i+1}$ reports that $STA_i$ is not available in the network, then other stations can delete the term $d_i$ and $STA_i$ from their service ring R. However, if $d_i>1$, this indicates that there is more than one station (but not known so far—joining) between $STA_i$ and $STA_{i+1}$, hence other stations only have to decrease $d_i$ by one upon receipt of the notification message. Moreover, the parameter $N_x$ decreases by one correspondingly.

Figure 3A:
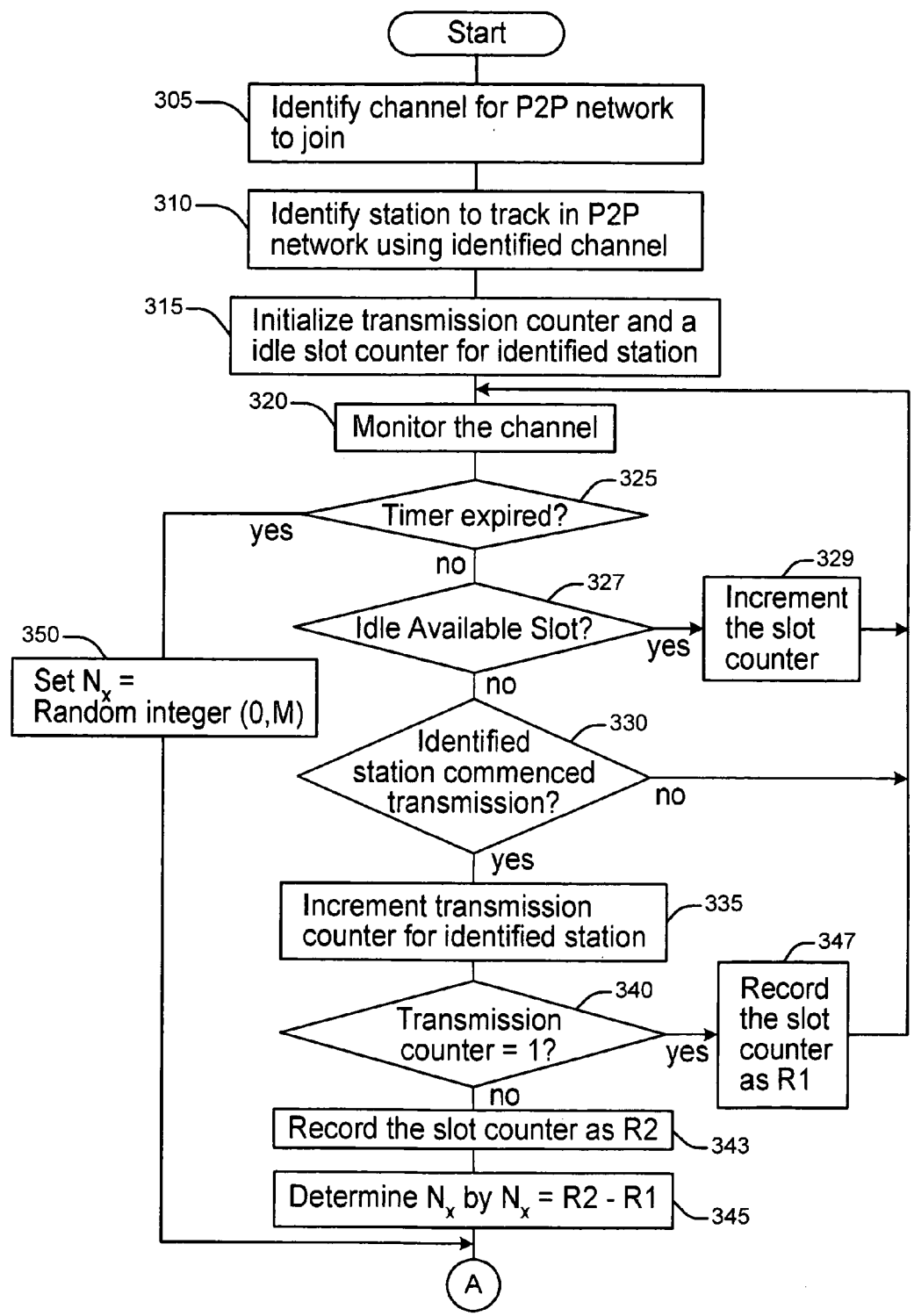
FIGS. 3A, 3B and 3C are flowcharts of an exemplary self-learning method of the present invention.
Figure 3B:
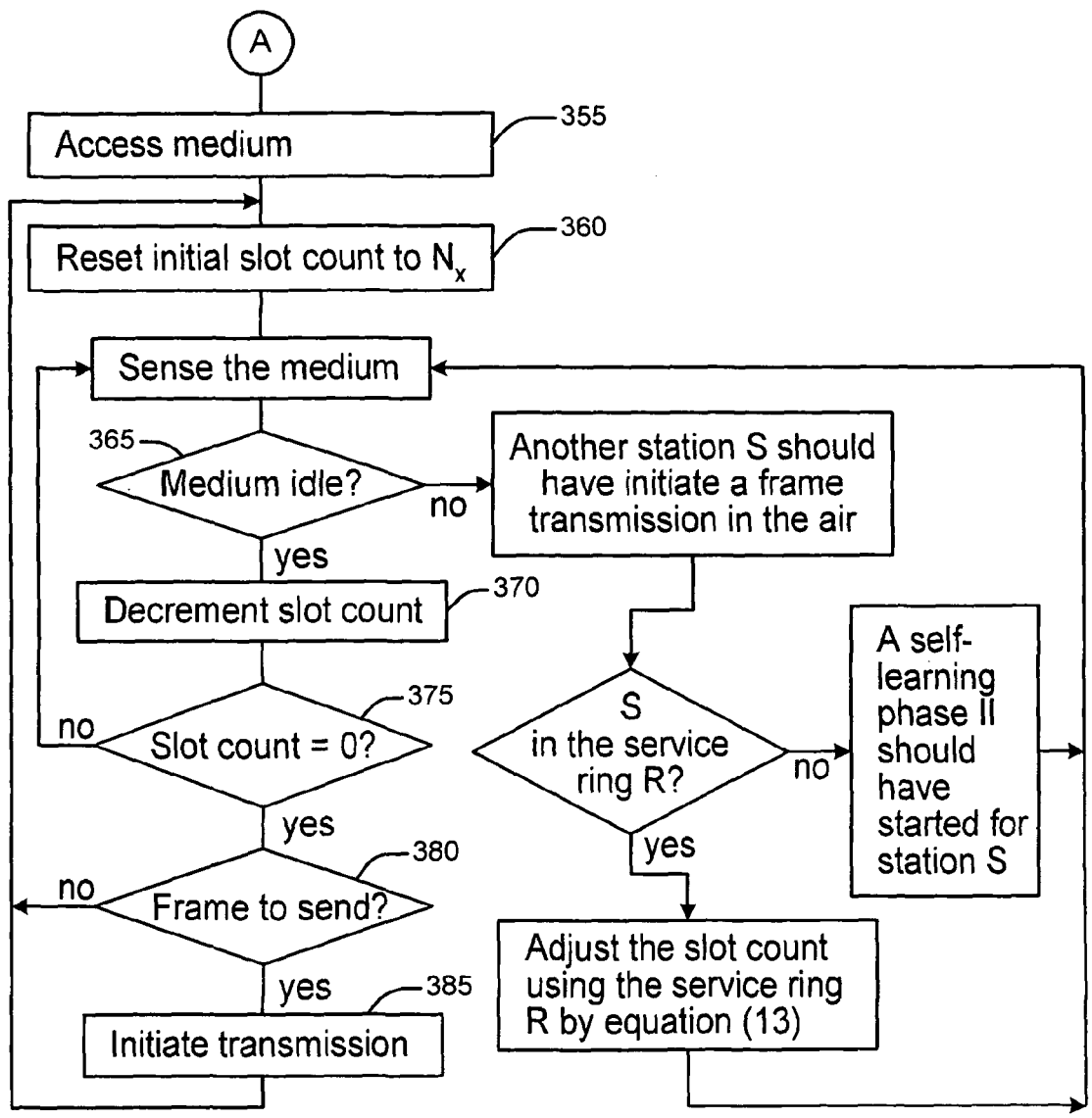
Figure 3C:
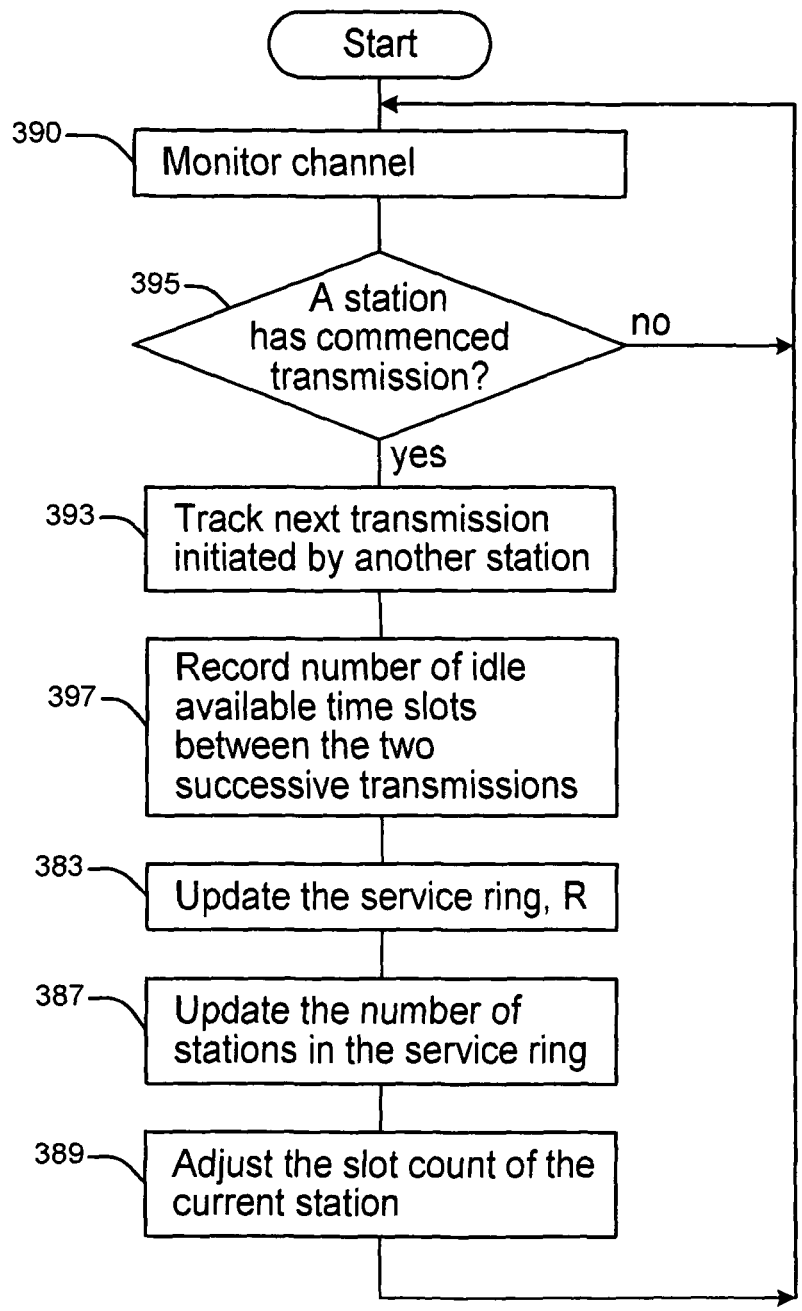

FIGS. 3A, 3B and 3C give a schematic illustration of the self-learning phases of the present invention. FIG. 3A shows self-learning phase 1. FIG. 3C shows self-learning phase 2. FIG. 3B shows a station initiating frame transmission. The methods depicted in FIGS. 3B and 3C run in parallel after the method of FIG. 3A has completed. The flowcharts together show the operation of a station. Self-learning phases 1 and 2 can be running concurrently for different stations.

Before a station initiates its first access to the shared medium, a station initiates a self-learning procedure to estimate the parameter $N_x$. This self-learning procedure is denoted as self-learning phase 1, which should be completed within a predetermined time T. If the station cannot determine the $N_x$ until the expiration of T, then it can use a random value in the range of [0, M], where M is a small integer in order to gain access to the communication medium. In the self-learning phase 1, the station can derive the parameter $N_x$ by counting the number of idle available time slots $D_i$ between two successive transmissions initiated by the same station i. When more than one station has initiated transmissions twice in this period, the station can determine the $N_x$ by finding the greatest common factor of those $D_i$. The station uses PIFS to access the medium at a random time for the first attempt to avoid collision with other stations. Once successfully accessed, the station broadcasts a notification message to announce its existence. Each station receiving this message inserts this new station into its service ring R. The station uses normal DIFS for the subsequent attempts of medium access. The station uses the $N_x$ to reset its initial slot count. It decrements its back-off slot count when the medium is sensed to be idle for each physical time slot after a DIFS. If the slot count is reduced to zero, the station gets an opportunity for frame transmission. If the station has frames in its sending/transmission buffer, the station initiates a new transmission in this time slot. Otherwise, the station foregoes this transmission opportunity. In either case, the station resets its back-off slot count to $N_x$ for a new round of back-off.

The station can use the self-learning procedure to construct and update the service ring R on-line. This procedure denoted herein as self-learning phase 2, is performed whenever the station remains in the network. The service ring R is used to adjust and calibrate each station's back-off slot count upon any station's frame transmission over the shared medium (e.g., over the air). It is useful to suppress the impact of the physical sensing errors on the performance of back-off procedure. In self-learning phase 2, the station can update the service ring R by counting the number of consecutive idle available time slots between two successive frame transmissions over the shared medium by separate stations. It is possible that a newly learned result may not be the same as the previous result, i.e., $d_i \neq d_i'$. In this situation, the station can derive a proper result by averaging the historical results, or more generally, by assigning each historical result an appropriate weight and summing them, $$d_i = \partial \cdot d_i' + \beta \cdot d_i'' + \gamma \cdot d_i''' +$$

$$1 = \partial + \beta + \gamma + \quad (12)$$

During self-learning phase 2, once the service ring has been updated, the parameter $N_x$ is changed correspondently according to equation (7).

Still referring to FIGS. 3A, 3B and 3C, in FIG. 3A, at 305, the station identifies a channel for peer-to-peer network that the station wishes to join. Once the station has identified a channel, then the station wishing to join the peer-to-peer network identifies a station at 310 in order to track communications of the member station using the identified channel. This is done to determine how many stations are in the peer-to-peer network (the number of stations is indicative of the number of available time slots). At 315 a transmission counter and an idle time slot counter are initialized for the identified station. An idle slot time counter is used to keep track of and record the number of available idle time slots. At 320 the joining station monitors the channel in order to determine when the identified station has transmitted so that the joining station can determine the number of stations (available time slots) in the peer-to-peer network (service ring). A timer is checked at 325 to determine if the process has exceeded a predetermined timer value. If the timer has not expired then a test is performed at 327 to determine if an idle slot time has been sensed. If an idle slot time has been sensed then the idle slot time counter is incremented at 329. Processing then returns to 320. It should be noted that a scheme that decrements the idle slot time counter could be used of a scheme that increments the idle slot time counter. If an idle slot time has not been sensed then at 330, a determination is made if the identified station has commenced transmission. If the identified station has commenced transmission then the transmission counter for the identified station is incremented at 335. At 340, a test of the transmission counter is performed in order to determine if there has been a frame transmission made by the identified station. If the identified station has made a frame transmission, then the idle slot time counter is recorded at 347. Processing then returns to 320. If this is not the first frame transmission by the identified station then the idle slot time counter is recorded at 343. The number of stations (available time slots) can then be determined at 345. If the identified station has not commenced transmission at 330 then processing returns to 320. If the timer has expired at 325, then the number of stations (available time slots) is set arbitrarily to a small random integer in the range of [0, M] at 350.

Continuing to FIG. 3B, if the number of stations has been determined or arbitrarily set, then at 355, the station accesses the communication medium. At 360 the slot count is reset. At 363, the medium is sensed. The medium is tested at 365 to determine if it is idle. If the medium is idle then the station's slot count is decremented at 370. Please note that a method using incrementing instead of decrementing is possible. A test is made at 375 to determine if the station's slot count has been reduced to 0. If the station's slot count is 0, then a test is made at 380 to determine if the station has a frame to send/transmit. If the station has a frame to transmit then frame transmission is initiated at 385. Processing then proceeds to 360. If there is no frame to transmit at 380 then processing returns to 360. If the station's slot count is not 0 at 375, then processing returns to 363. If the medium is not idle at 365 then the service ring R serves as a basis for a station/node/peer to calibrate the slot count, since a station/node/peer can capture frames from/off the shared medium. For example, when station j has concluded a frame transmission and at least one frame of this transaction has been captured by station i, then station i can use the service ring R to recalculate its slot count slot(i) using the following equation:

$$\text{slot}(i) = \begin{cases} \sum_{m=j}^{i-1} d_m \text{mod}(N_x) & \text{when } i > j \text{ in the service ring } R \\ \sum_{m=j}^{k} d_m + \sum_{m=1}^{i-1} d_m \text{mod}(N_x) & \text{otherwise} \end{cases} \quad (13)$$

where k denotes the total number of stations in the service ring R, as shown in equation (6), and $N_x$ denotes the estimated number of stations in the network. At 367, the current (joining) station detects another station, S, initiating a frame transmission over the shared medium. A test is performed at 369 to determine if station S is in the service ring, R. If station S is in service ring R already then at 373 the current station adjusts the slot count using the service ring and equation 13. The process then returns to 363. If station S is not in the service ring then self-learning phase 2 starts for station S at 377. Station S is another station that initiates a frame transmission over the shared medium. Note that at this point of time, the current station, denoted as A, has successfully joined the network. Hence, once it detects that station S (station S is not in the service ring) has initiated a frame transmission, station A can start self-learning phase 2 to learn the appropriate sequence for S in the ring R. Service ring R consists of stations that have joined the decentralized/peer-to-peer network. Assume that there are currently 3 stations numbered 1, 2, 3 in the peer-to-peer network and station 4 has just joined the peer-to-peer network. When station 1 initiates a frame transmission over the shared medium and is detected by station 4, because station 1 is not in station 4's service ring R, station 4 starts self-learning phase 2 for station 1 by tracking station 1's next transmission. A similar procedure can happen for station 2 and 3 to form a complete service ring. Because the dynamical evolvement of the network, a station should start the self-learning phase II frequently to update the service ring R. The value of $d_i$ is retrieved by the self-learning phase 2 (FIG. 3C)

Using equation (13), a station can calibrate its slot count each time a frame exchange sequence is concluded over the shared medium. The broadcasting nature of communication in the contention based network with shared medium facilitates the calibration procedure, as a frame in the air can be detected by all interfaces sharing the medium. The calibration procedure can be used to resolve collisions that are caused by physical sensing errors. For example, if two stations/nodes/peers collide at one slot time, then before next round of service, both can recalculate their slot count using the calibration procedure to avoid colliding again. The adoption of calibration procedure to the DEB algorithm significantly mitigates the issue of collision introduced by the physical sensing errors, and greatly improves the robustness of the DEB algorithm with respect to bad channel conditions.

Continuing to FIG. 3C, which depicts self-learning phase 2, at 390 the station monitors the channel for the peer-to-peer network (service ring). At 395 a test is made to determine if a station has initiated a frame transmission. If a station has initiated a frame transmission then frame transmission is tracked by another station at 393. At 397, the number of idle available time slots between two successive transmissions is recorded. The service ring is then updated at 383 by counting a number of consecutive available idle time slots between two successive frame transmissions over the shared medium by two different stations. At 387, a number of stations in the service ring is updated. The slot count for the current station is adjusted at 389. If a station has not commenced frame transmission at 395, then processing returns to 390.

It should be noted that the processing described by the above flowcharts can be implemented on a processor in software or hardware or firmware or any combination including application specific integrated circuits (ASICs) or field programmable gate arrays (FPGAs).

Figure 4:
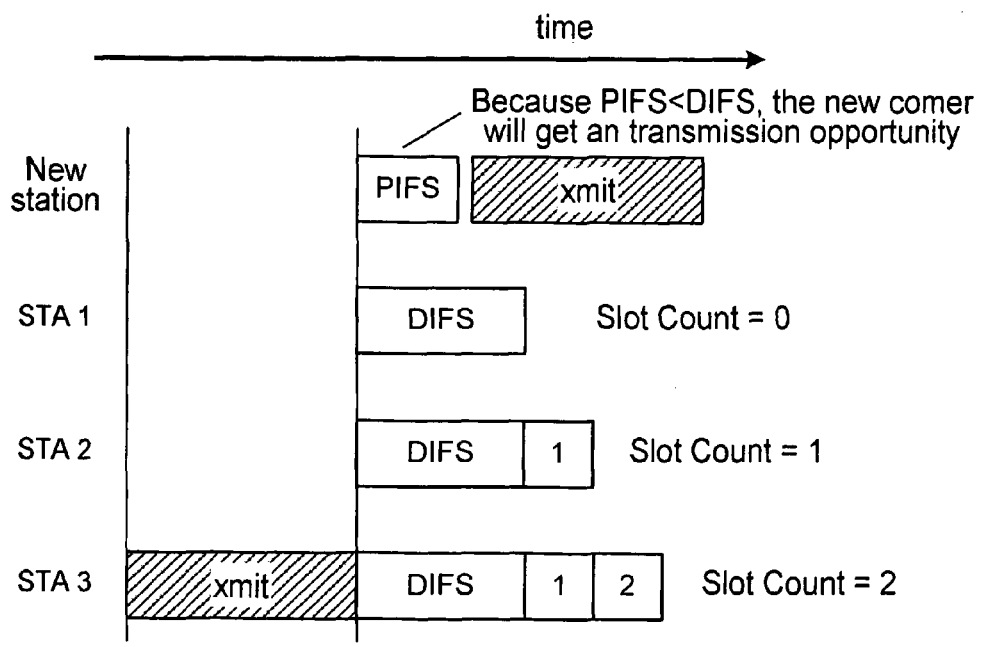
FIG. 4 depicts the PIFS, DIFS and transmitting times and time slots.

FIG. 4 depicts the PIFS, DIFS and transmit times and time slots. Specifically, if a joining station cannot determine the number of stations (available time slots) in a predetermined time T, then the joining station can select a random small integer in the range of [0, M] and begin transmitting a frame. This frame is transmitted after a PIFS time, which is shorter than a DIFS time. That is, the joining station can "grab" access to the medium before the member stations being their frame transmissions in their time slots. The use of PIFS (equal to one time slot plus a SIFS (short inter-frame space), typically 30 µs for IEEE 802.11b) is to avoid contention between the joining station and other members of the network. When the joining station gains access to the medium by PIFS, then all other member stations/nodes/peers should detect the frame transmission of the joining station/node/peer in their DIFS (equal to two time slots plus a SIFS, typically 50 µs for IEEE 802.11b) that a new station/node/peer has commenced transmission over the air. The other member stations/nodes/peers will defer their access to the medium. However, the slot counts of the member stations/nodes/peers will not decrease at the PIFS because the member stations/nodes/peers are assumed to decrement after a DIFS idle time.

Figure 5:
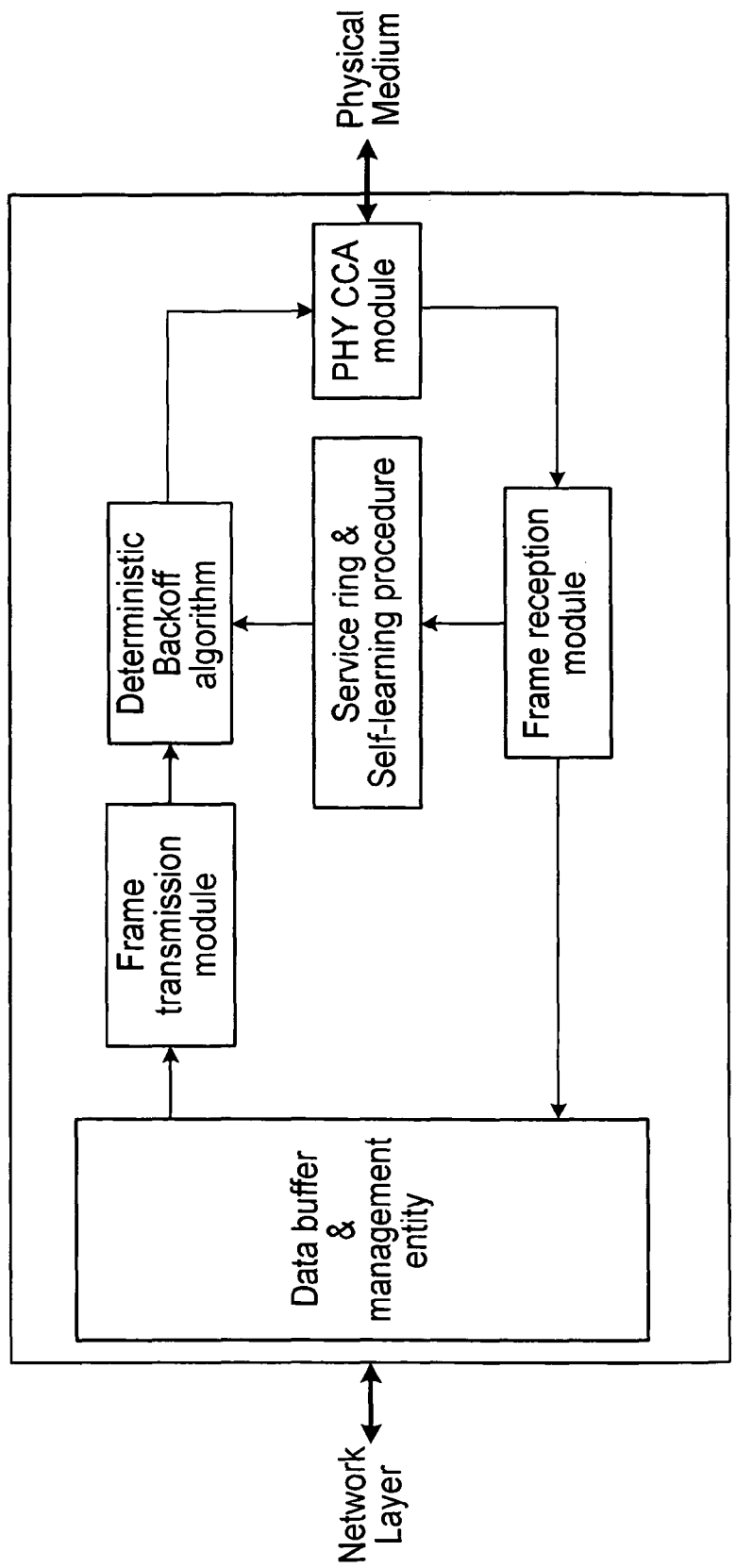
FIG. 5 is a schematic diagram of the present invention.

FIG. 5 is a schematic diagram of a station of the present invention. Specifically, the method of the present invention is implemented at the MAC layer. The MAC layer interfaces with the physical layer to the right and to the network layer to the left. The data buffer and management entity 505 is a module that interfaces with the network layer and provides data buffering and management services between the present invention and the network layer. Frame transmission module 510 stores the frames to be transmitted through the deterministic back-off method in a peer-to-peer environment. Frame transmission module 510 receives the frames to be transmitted from data buffer and management entity 505. The deterministic back-off method 515, which effectively reduces or eliminates contention in a contention-based network is as taught in Applicants' earlier applications. Deterministic back-off module 515 interfaces to frame transmission module 510, PHY CCA module 525 and service ring and self-learning module 520. Service ring and self-learning module 520 is the method for obtaining and distributing the global information necessary for proper operation of the deterministic back-off method in a peer-to-peer environment. Service ring and self-learning module interfaces to deterministic back-off module 515 and frame reception module 530. PHY CCA module 525 interfaces with the physical layer. PHY CCA module interfaces to deterministic back-off module 515 and to frame reception module 530. Frame reception module 530 stores frames addressed to/destined for and received by the station. Frame reception module 530 interfaces with data buffer and management entity 505, service ring and self-learning module 520 and PHY CCA module 525.

It is to be understood that the present invention may be implemented in various forms of hardware (e.g. ASIC chip), software, firmware, special purpose processors, or a combination thereof, for example, within a server, an intermediate device (such as a wireless access point or a wireless router) or mobile device. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, said method comprising:
identifying a channel that a decentralized network is using for communications; and
identifying a station that is a member of said decentralized network to monitor data transmission activity over said identified channel; and
further comprising determining a number of member stations in said decentralized network, wherein said determining act further comprises determining said number of member stations by calculating a slot count between successive data transmissions by said identified member station and if a predetermined time period has elapsed, setting said number of stations to a randomly small number.

2. The method according to claim 1, wherein said decentralized network is a peer-to-peer network.

3. The method according to claim 1, wherein said decentralized network is a wireless network.

4. The method according to claim 3, wherein said wireless network is a single hop wireless network.

5. A deterministic back-off method for a decentralized network including a plurality of stations, said method comprising:
monitoring a communication medium by a station of the plurality of stations of the decentralized network;
determining if said communication medium is idle;
transmitting data by said station if said communication medium is idle and if said station has a data to transmit; and
adjusting, by said station, a slot count and a service ring configuration of said decentralized network if said medium is busy;
wherein said adjusting act further comprises calculating said slot count using $$\sum_{m=j}^{i-1} d_m \bmod(N_x)$$

when i>j in the service ring.

6. The method according to claim 5, wherein said communication medium is in a decentralized network, and further wherein said decentralized network is a peer-to-peer network.

7. The method according to claim 5, wherein said decentralized network is a wireless network.

8. The method according to claim 7, wherein said wireless network is a single hop wireless network.

9. A deterministic back-off method for a decentralized network including a plurality of stations, said method comprising:
monitoring a communication medium by a station of the plurality of stations of the decentralized network;
determining if said communication medium is idle;
transmitting data by said station if said communication medium is idle and if said station has a data to transmit; and
adjusting, by said station, a slot count and a service ring configuration of said decentralized network if said medium is busy;
wherein said adjusting act further comprises calculating said slot count using $$\sum_{m=j}^{k} d_m + \sum_{m=1}^{i-1} d_m \bmod(N_x)$$

when i≤j in the service ring.

10. A deterministic back-off apparatus for a decentralized network used in a station comprising:
means for identifying a channel that a decentralized network is using for communications; and
means for identifying a station that is a member f said decentralized network to monitor data transmission activity over said identified channel; and
further comprising means for determining a number of member stations in said decentralized network, wherein said means for determining further comprises means for determining said number of member stations by calculating a slot count between successive frame transmissions by said identified member station and if the process has exceeded a predetermined timer value, means for setting said number of stations to a randomly small number.

11. The apparatus according to claim 10, wherein said decentralized network is a peer-to-peer network.

12. The apparatus according to claim 10, wherein said decentralized network is a wireless network.

13. The apparatus according to claim 12, wherein said wireless network is a single hop wireless network.

14. An apparatus for a station to transmit a frame over a communication medium of a decentralized network, comprising:
means for monitoring said communication medium by said station;
means for determining if said communication medium is idle;
means for transmitting data by said station if said communication medium is idle and if said station has data to transmit; and means for adjusting a slot count and a service ring configuration if said medium is busy;
wherein said means for adjusting further comprises means for calculating said slot count using $$\sum_{m=j}^{i-1} d_m \mathrm{mod}(N_x)$$

when i>j in the service ring.

15. The apparatus according to claim 14, wherein said decentralized network is a peer-to-peer network.

16. The apparatus according to claim 14, wherein said decentralized network is a wireless network.

17. The apparatus according to claim 16, wherein said wireless network is a single hop wireless network.

18. An apparatus for a station to transmit a frame over a communication medium of a decentralized network, comprising:

means for monitoring said communication medium by said station;
means for determining if said communication medium is idle;
means for transmitting data by said station if said communication medium is idle and if said station has data to transmit; and
means for adjusting a slot count and a service ring configuration if said medium is busy;
wherein said means for adjusting further comprises means for calculating said slot count using $$\sum_{m=j}^{k} d_m + \sum_{m=1}^{i-1} d_m \mathrm{mod}(N_x)$$

when i≤j in the service ring.

* * * * *